United States Patent [19]
Weder

[11] Patent Number: 4,835,834
[45] Date of Patent: Jun. 6, 1989

[54] METHOD OF SHAPING AND HOLDING A SHEET OF MATERIAL ABOUT A FLOWER POT WITH A COLLAR

[75] Inventor: Donald E. Weder, Highland, Ill.

[73] Assignee: Highland Supply Corporation, Highland, Ill.

[21] Appl. No.: 232,541

[22] Filed: Aug. 11, 1988

Related U.S. Application Data

[63] Continuation of Ser. No. 876,405, Jun. 20, 1986, abandoned.

[51] Int. Cl.[4] .................... B23P 19/02
[52] U.S. Cl. .................... 29/525; 29/432; 29/505; 29/525.1; 47/72; 206/423; 215/100.5; 229/87 P
[58] Field of Search .................... 29/450, 505, 525, 235; 47/66, 72, 84; 206/423; 215/100.5; 229/87 P; 248/100, 101; 101/9; 414/787

[56] References Cited

U.S. PATENT DOCUMENTS

| | | | |
|---|---|---|---|
| 1,446,563 | 2/1923 | Hughes . | |
| 1,868,853 | 7/1932 | Sievers . | |
| 1,924,926 | 8/1933 | Gray | 215/100.5 |
| 2,355,559 | 8/1944 | Renner | 47/72 X |
| 2,827,217 | 3/1958 | Clement | 47/72 X |
| 3,013,689 | 12/1961 | Shropshire | 215/100.5 |
| 3,376,666 | 4/1968 | Leonard | 229/87 P X |
| 3,488,022 | 1/1970 | Vittori | 47/66 X |
| 3,962,503 | 6/1976 | Crawford | 428/40 |
| 4,031,663 | 6/1977 | Brunk | 47/72 X |
| 4,043,077 | 8/1977 | Stonehocker | 47/66 |
| 4,283,032 | 8/1981 | Smith | 248/101 X |
| 4,300,312 | 11/1981 | Weder et al. | 47/72 |
| 4,338,979 | 7/1982 | Dow | 248/101 X |
| 4,340,146 | 7/1982 | Stratton | 215/100.5 |
| 4,413,725 | 11/1983 | Bruno et al. | 206/423 X |
| 4,488,697 | 12/1984 | Garvey | 248/101 |
| 4,733,521 | 3/1988 | Weder et al. | 47/72 X |
| 4,773,182 | 9/1988 | Weder et al. | 47/72 |

FOREIGN PATENT DOCUMENTS

| | | | |
|---|---|---|---|
| 560532 | 4/1975 | Switzerland | 206/423 |

*Primary Examiner*—Charlie T. Moon
*Attorney, Agent, or Firm*—Dunlap, Codding, Peterson & Lee

[57] ABSTRACT

An article and method for shaping a sheet of material around an object such as a flower pot, the article comprising a ring-shaped collar adapted to be secured around the object. The collar may comprise pinch rings or barbed piercing elements, disposed about the periphery of the collar for attaching the sheet of material to the collar, or the collar may be adapted to be secured around at least a portion of the object so that the sheet of material is held between the object and the collar. The article also may be used alone for shaping a sheet of material.

2 Claims, 4 Drawing Sheets

METHOD OF SHAPING AND HOLDING A SHEET OF MATERIAL ABOUT A FLOWER POT WITH A COLLAR

This application is a continuation of Ser. No. 876,405, filed June 20, 1986, now abandoned.

FIELD OF THE INVENTION

The present invention relates generally to articles for shaping sheets of material around objects and more particularly to flower pot accessories.

SUMMARY OF THE INVENTION

The present invention comprises an article for shaping a sheet of material around an object, the article comprising a collar adapted to be secured around at least a portion of the object, and means disposed about the periphery of the collar for attaching the sheet of material to the collar. The present invention further comprises an article for shaping a sheet of material, the article comprising a collar and a means disposed about the periphery of the collar for attaching the sheet of material to the collar. The present invention further comprises an article for holding a sheet of material around an object, comprising a collar adapted to be secured around at least a portion of the object so that the sheet of material is held between the object and the collar.

DETAILED DESCRIPTION OF THE PREFERRED EMBODIMENT

The present invention comprises an accessory useful for shaping a sheet of decorative material around an otherwise plain, if not unsightly, flower pot. The article comprising the present invention is inexpensive to manufacture, easy to use, and may be reused repeatedly. Although the preferred embodiment is a flower pot accessory, the present invention has mahy other applications. For example, it may be used to free form a container, or other articles, from a sheet of material. It may be used as a reusable frame for trays or coasters, or as a device for holding a paper napkin around a drinking glass, allowing the material forming the usuable surface to be changed or discarded.

Figure 1:
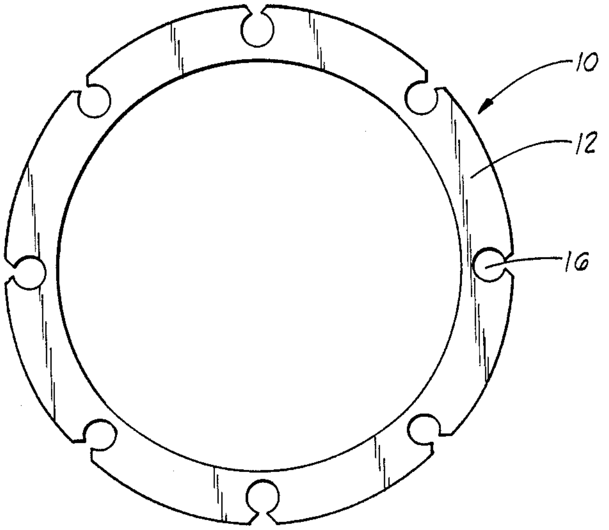
FIG. 1 is a plan view of one embodiment of the article of the present invention.
Figure 4:
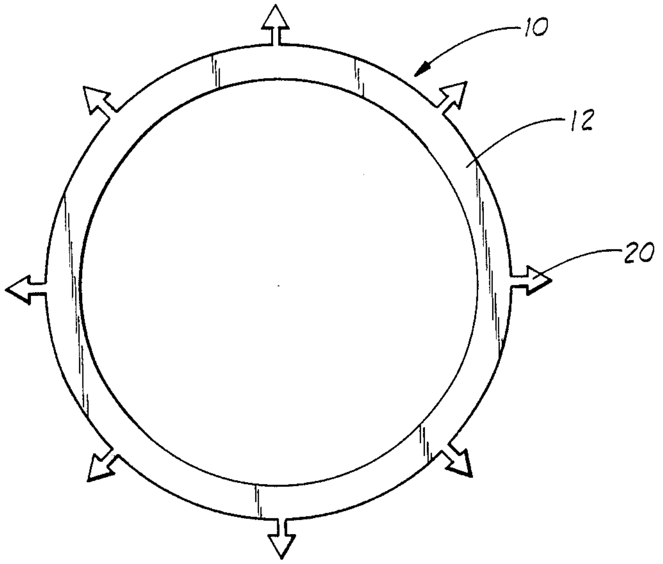
FIG. 4 is a plan view of a second embodiment of the article of the present invention.
Figure 6:
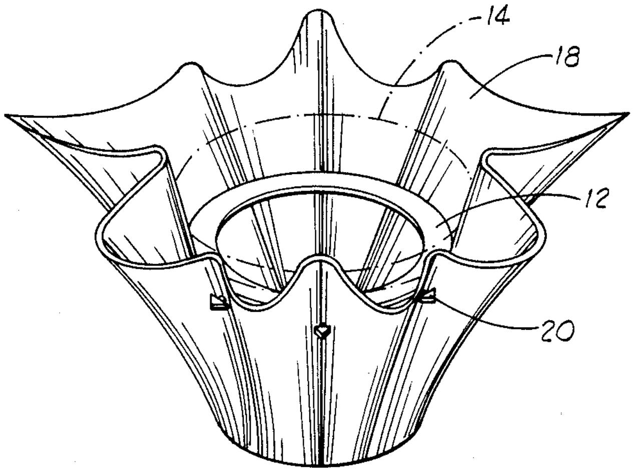
FIG. 6 is a perspective view of the article of FIG. 4 showing a sheet of material attached to the article. The broken lines designate the position of the flower pot omitted in this figure to show the attachment of the sheet of material to the article.

As shown in FIGS. 1, 4 and 6, the article 10 of the present invention comprises a collar 12. In the preferred embodiments, the collar 12 is ring-shaped. However, it is to be understood that the shape of the collar 12 will vary according to the shape of the object (or other purpose) for which the article is to be used. Further, the collar 12 may be constructed so as to be conformable to a variety of shapes, or it may be formed of a rigid material and constructed in a preselected shape. For example, the collar 12 may be a rigid plastic ring having an internal diameter equal to the external diameter of the object 14 about which the collar 12 is intended to be secured.

Figure 2:
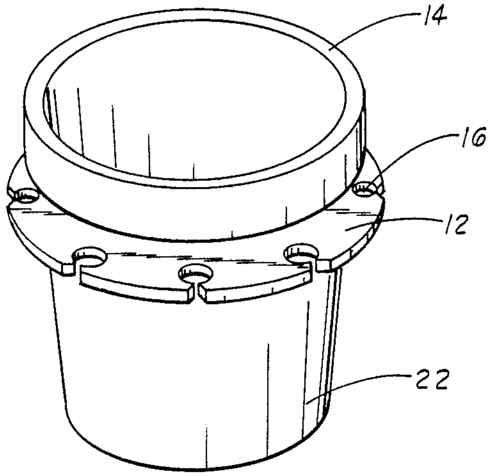
FIG. 2 is a perspective view of the article of FIG. 1 showing the article secured around a flower pot.
Figure 5:
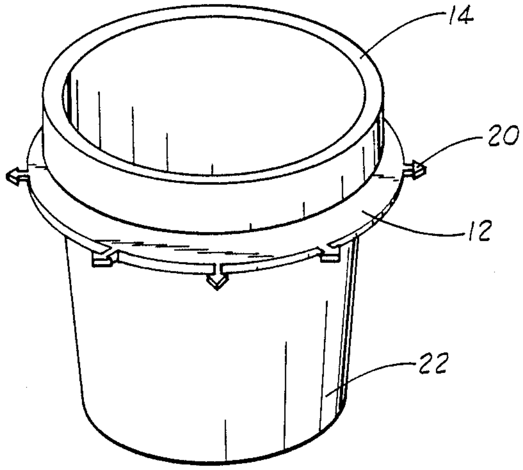
FIG. 5 is a perspective view of the article of FIG. 4 showing the article secured around a flower pot.
Figure 8:
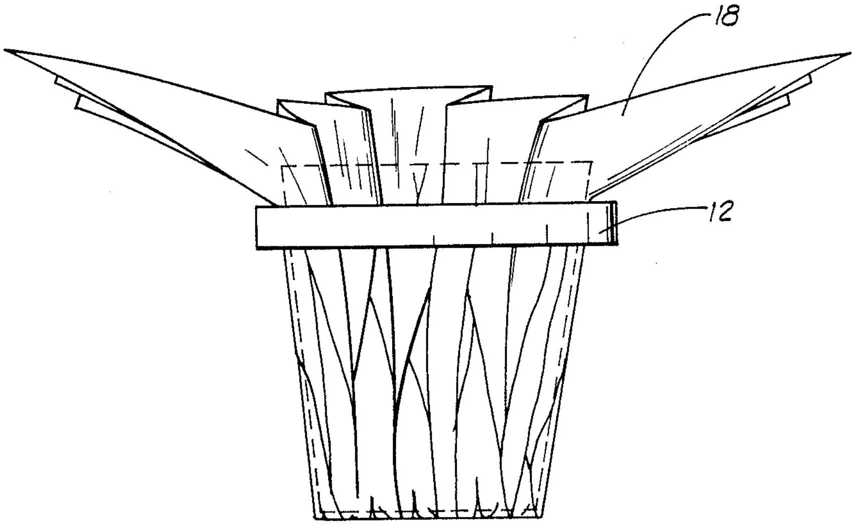
FIG. 8 is a perspective view of the article of FIG. 7 showing the article holding a sheet of material around a flower pot.

The collar 12 is adapted to be secured, and preferably removably secured, around at least a portion of an object 14, such as a flower pot, as shown in FIGS. 2, 5 and 8. Preferably, the collar 12 is formed of a lightweight, pliable material, such as rubber or plastic. In those instances where a lightweight collar 12 is desirable, the collar 12 may be hollow. On the other hand, a solid construction may provide additional strength and rigidity where such characteristics are desired.

Figure 3:
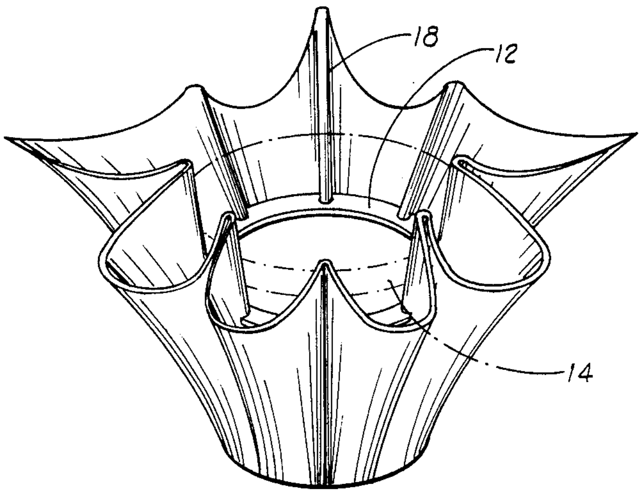
FIG. 3 is a perspective view of the article of FIG. 1 showing a sheet of material attached to the article. The broken lines designate the position of the flower pot, which is omitted in this figure to show the attachment of the sheet of material to the article.

In the embodiment shown in FIGS. 1, 2 and 3, the article 10 further comprises a polarity of pinch rings, only one of which is designated in the figures by the number 16. The pinch rings 16 are formed in, and disposed about, the periphery of the collar 12 as shown in FIG. 3. The pinch rings 16 function to attach the sheet of material 18 to the collar 12.

In the embodiment shown in FIGS. 4, 5 and 6, the article 10 comprises the collar 12 and a plurality of barbed piercing elements, only one of which is designated by the numeral 20. Like the pitch rings 16 of the embodiment shown in FIGS. 1, 2 and 3, and used in lieu thereof, the barbed piercing elements 20 are disposed about the periphery of the collar 12 and serve to attach the sheet of material 18 to the collar 12.

In use, the collar 12 of the embodiments shown in FIGS. 1–6 first is secured around at least a portion of the object 14, such as the flower pot shown in FIGS. 2 and 5. Next, the base 22 of the object (flower pot) 14 is positioned centrally over the sheet of material 18. With the object (flower pot) 14 positioned so, the outer portions of the sheet of material 18 manually are pulled up and around the object (flower pot) 14.

In the embodiment shown in FIGS. 1, 2 and 3, portions of the sheet of material are pulled into the pinch rings 16. Thus, the sheet of material 18 is shaped around the object (flower pot) 14 to which the collar 12 is secured.

In the embodiment shown in FIGS. 4, 5 and 6, portions of the sheet of material 18 are pulled taut and pressed against the barbed piercing elements 20 until the sheet of material 18 is punctured. Thus, the barbed piercing elements 20 function to pierce and hold the sheet of material 18 to the collar 12. Thereby, the sheet of material 18 is shaped around the object 14.

Figure 9:
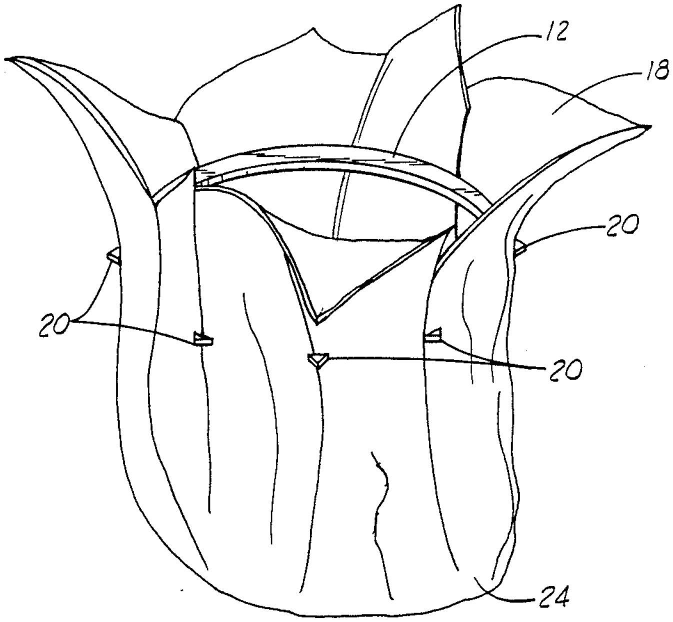
FIG. 9 is a perspective view of a sheet of material shaped (without an object) by attaching it to the collar shown in FIG. 4.

In still another embodiment shown in FIG. 9, the article of the present invention may be used to shape or "free form" a sheet of material 18. Portions of the sheet of material 18 are attached to the periphery of the collar 12 as described above but without the object 14 serving as a form, so that the central portion 24 of the sheet of material 18 is formed into the selected shape. For example, a lightweight, waterproof and decorative coaster or tray (depending on the dimensions of the collar 12) may be formed by pulling the central portion 24 of the sheet of material 18 tightly across the collar 12. For another example, where a material of sufficient body or stiffness is used, the outer aspects of the sheet of material 18 may be attached to the collar 12 to create a wide variety of items including containers of various and irregular shapes and festive party hats.

Figure 7:
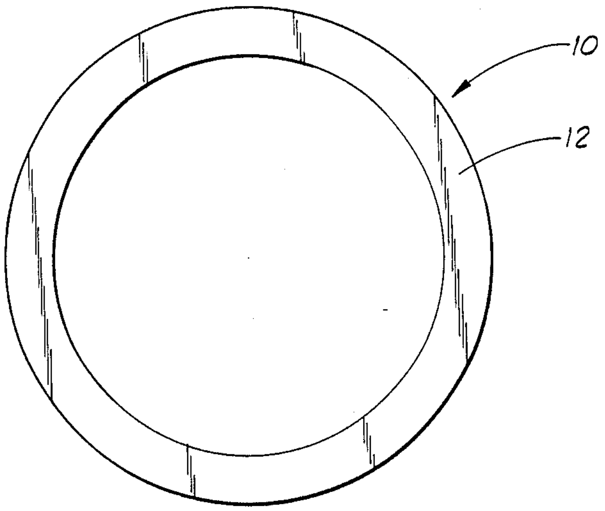
FIG. 7 is a plan view of a third embodiment of the present invention.

In a fourth embodiment shown in FIGS. 7 and 8, the object 14 first is positioned centrally over the sheet of material 18. The outer portions of the sheet of material 18 then are positioned up and around the object 14. Next, while the sheet of material 18 is held manually about the object 14, the base 22 of the object 14 is positioned within and pushed through the collar 12. Then, the collar 12 is secured around the object 14 over the sheet of material 18 so that the sheet of material is held between the object 14 and the collar 12, as shown in FIG. 8.

It also should be noted that the article of the present invention may be used with sheets of material of many different shapes and made of any suitably pliable substance. For example, materials commonly used in the florist industry, such as papers, textiles, cellophanes, foils and synthetic polymer films, come in many decorative forms and are particularly suitable where the article of the present invention is used as a flower pot accessory.

In those instances where the selected material has sufficient body to retain substantially the form of the object 14 around which the sheet of material 18 has been shaped, the object 14 may be removed from the collar 12 and the attached sheet of material. In these instances, the formed sheet of material 18 and the collar 12 may be used alone or may be used and reused to cover other objects, Further, where moldable materials, such as foil, are used, the form of the sheet of material 18 may be altered by hand as desired, once the object 14 has been removed.

It should be noted that the embodiment shown in the drawings disclose the use of the article of the present invention as a flower pot accessory for shaping a sheet of material around a flower pot, the present invention is adaptable for use with many other kinds of containers and objects. Similarly, although the object 14 as shown in FIGS. 2, 5 and 8 is frustoconical in shape, the article of the present invention is adaptable for use with objects having many different shapes, including objects having curved and straight sides.

Changes may be made in the various parts, elements and assemblies described herein without departing from the spirit and scope of the invention as defined in the following claims.

What is claimed is:

1. A method for shaping and holding a sheet of material about the base and outwardly tapered outer peripheral surface of a flower pot, comprising:

providing a collar constructed of a relatively rigid material and having an opening formed therethrough;

positioning the sheet of material generally about the base and outwardly tapered outer peripheral surface of the flower pot; and extending the positioned sheet of material and the flower pot base through the opening in the collar and pressing the collar around and along the positioned sheet and outwardly tapered outer peripheral surface of the flower pot with the sheet of material and the flower pot extending through the opening in the collar so the sheet of material is held between the collar and the flower pot near an end there of remote from said base.

2. The method of claim 1 wherein the sheet of material is defined further as being constructed of a non-shape sustaining material.

* * * * *